B. STECHBART.
MOTION PICTURE MACHINE.
APPLICATION FILED MAY 7, 1917. RENEWED AUG. 8, 1918.

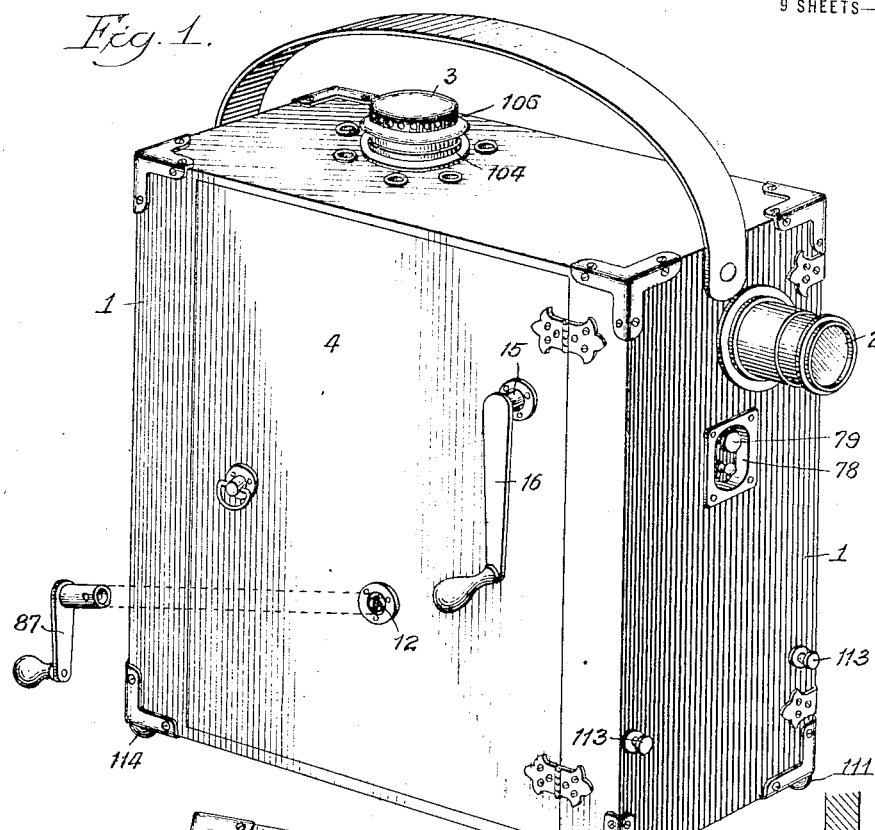
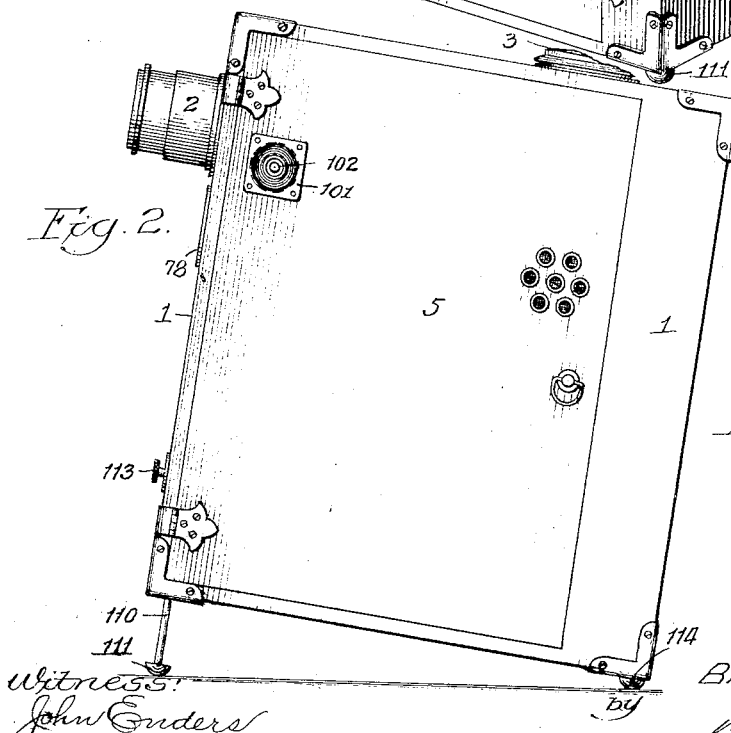
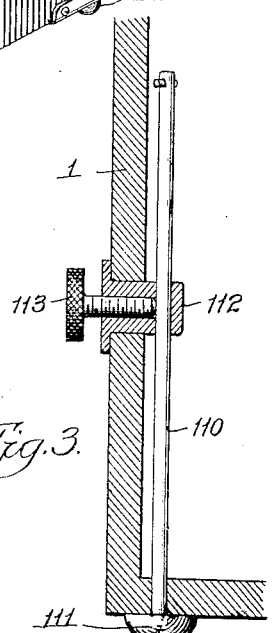

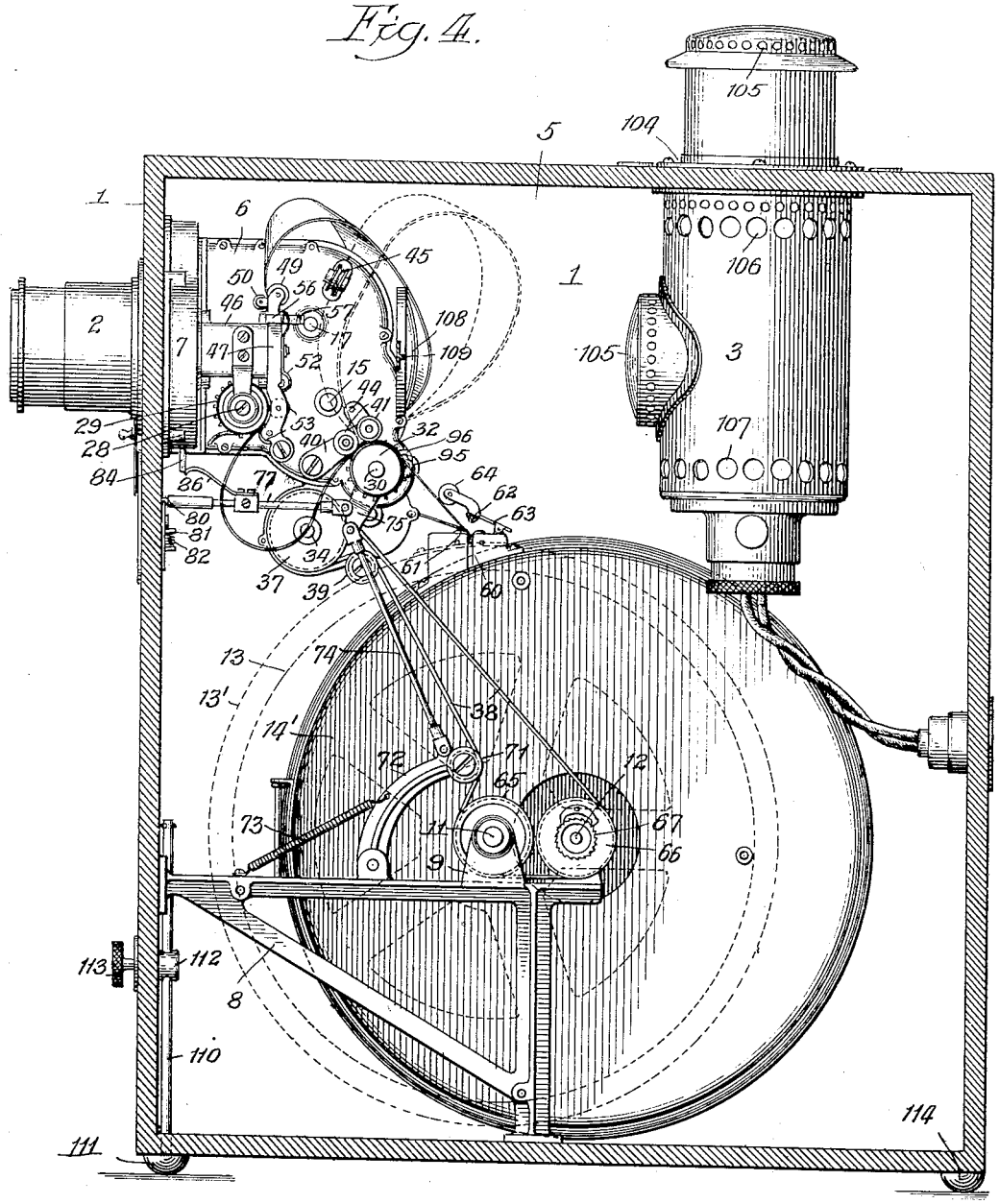

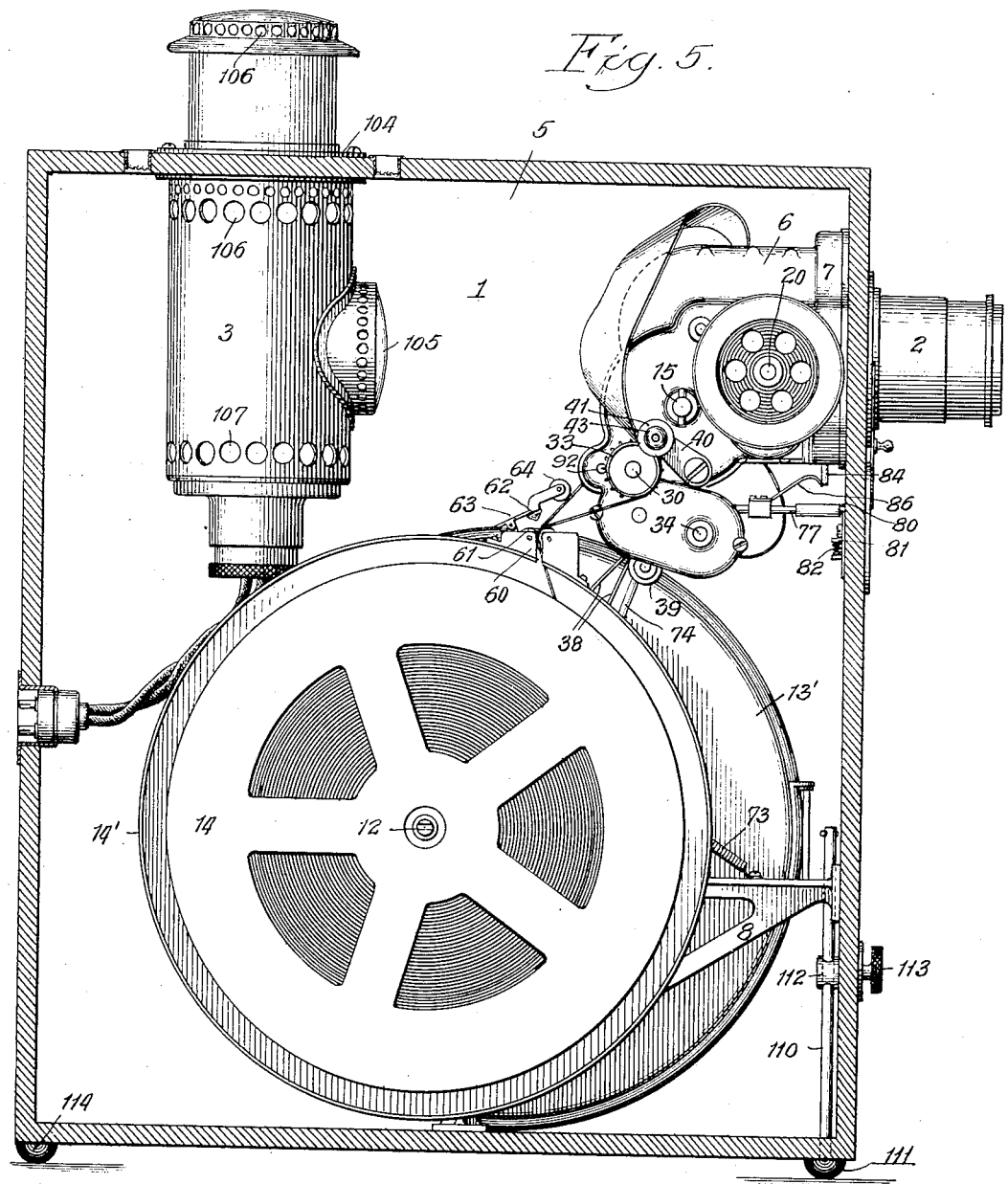

1,287,503.

Patented Dec. 10, 1918.
9 SHEETS—SHEET 4.

B. STECHBART.
MOTION PICTURE MACHINE.
APPLICATION FILED MAY 7, 1917. RENEWED AUG. 8, 1918.

1,287,503.

Patented Dec. 10, 1918.
9 SHEETS—SHEET 6.

Witness:
John Enders

Inventor
BRUNO STECHBART,
by Robert Burns, Atty.

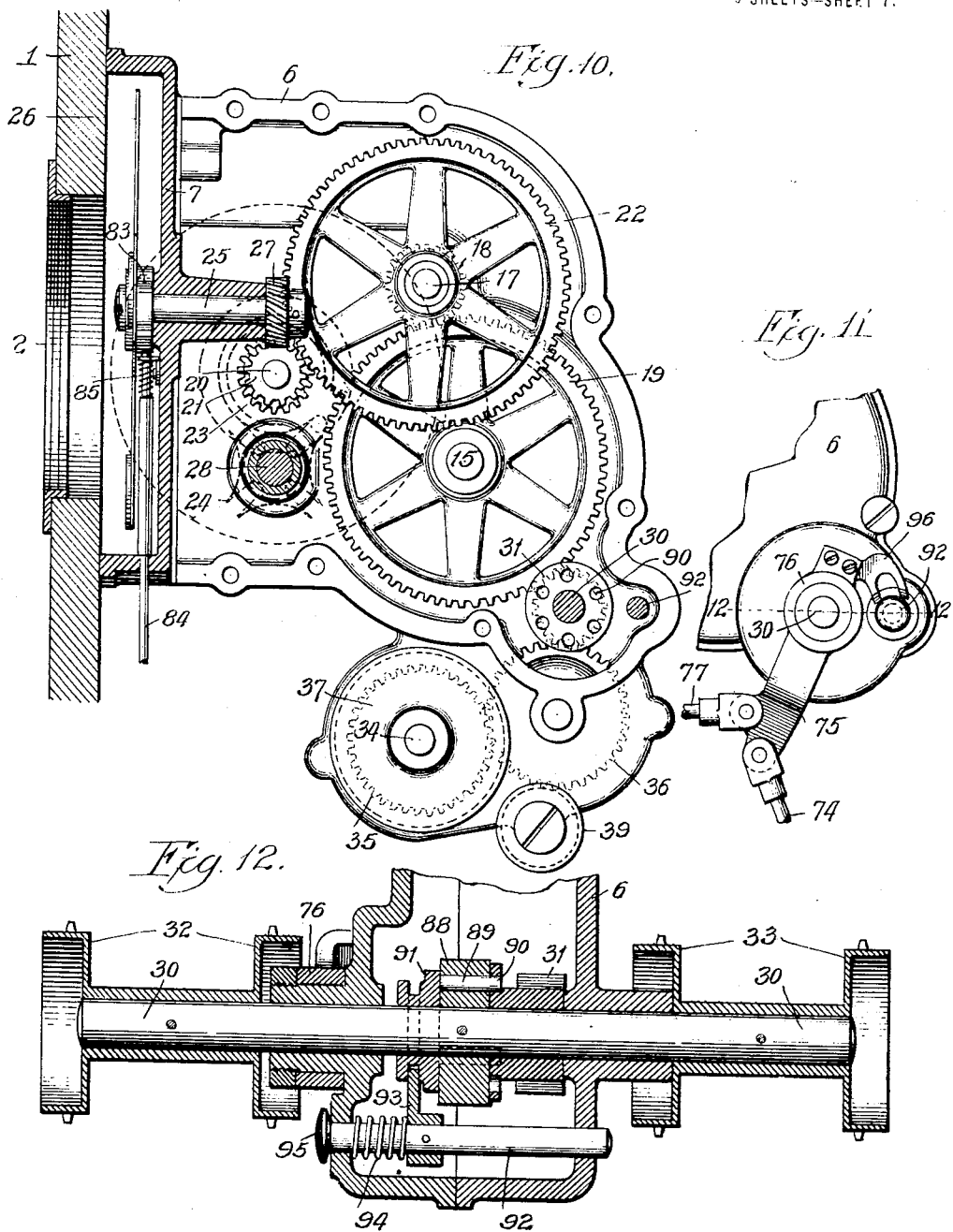

B. STECHBART.
MOTION PICTURE MACHINE.
APPLICATION FILED MAY 7, 1917. RENEWED AUG. 8, 1918.

1,287,503.

Patented Dec. 10, 1918.
9 SHEETS—SHEET 8.

Witness:
John Enders.

Inventor
BRUNO STECHBART,
by
Robert Burns
Atty.

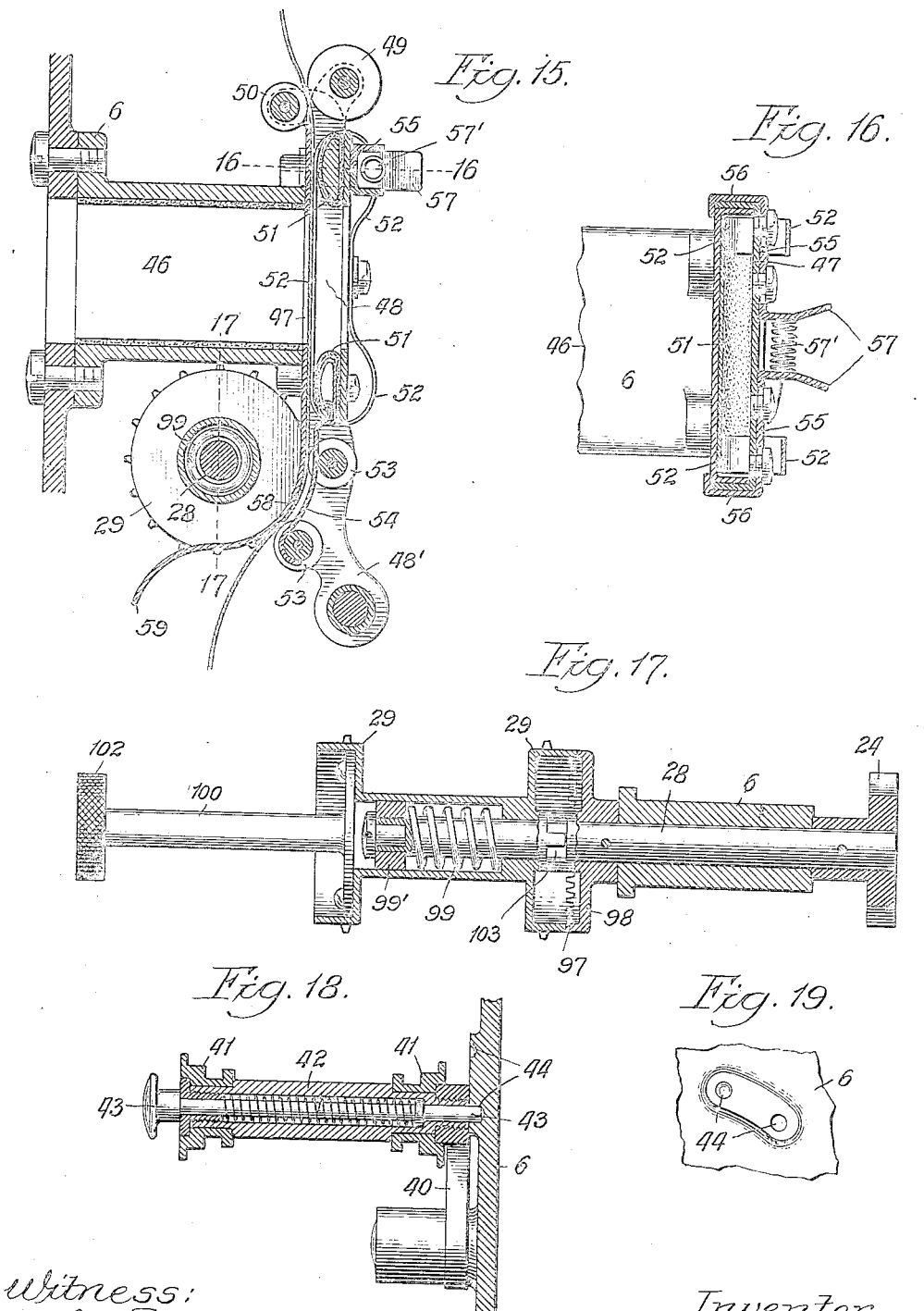

UNITED STATES PATENT OFFICE.

BRUNO STECHBART, OF CHICAGO, ILLINOIS, ASSIGNOR, BY MESNE ASSIGNMENTS, TO AMERICAN PROJECTING COMPANY, OF CHICAGO, ILLINOIS, A CORPORATION OF DELAWARE.

MOTION-PICTURE MACHINE.

1,287,503.    Specification of Letters Patent.    Patented Dec. 10, 1918.

Application filed May 7, 1917, Serial No. 166,865. Renewed August 8, 1918. Serial No. 248,963.

*To all whom it may concern:*

Be it known that I, BRUNO STECHBART, a citizen of the United States of America, and a resident of Chicago, in the county of Cook, State of Illinois, have invented certain new and useful Improvements in Motion-Picture Machines, of which the following is a specification.

This invention relates to motion picture machines, and more especially to that type of such machines in which the coöperating film feeding and reeling mechanisms are compactly arranged within an inclosing casing, common to both, to afford a self-contained and portable exhibiting apparatus. And the present improvement has for its various objects:—

To provide a structural formation and association of parts whereby the film feeding mechanism can be locked in an inactive condition during the period in which the rewinding operation of the picture film back onto the delivery reel is effected, after an exhibition of said film and with which the locked condition of the film feeding mechanism is maintained until the operator effects a release thereof, by a change or shift of the actuating mechanism of the film reels from such rewinding position back to a normal winding condition in which the film is free for a normal intermittent feed past the light aperture of the machine.

To provide a simple and effective holding mechanism common to the locking means of the intermittent film feeding mechanism and the actuating means of the pair of companion film reels aforesaid, the association being such that as said holding means is released from its holding engagement, the operator can effect the reversal or reëngagement of the reel driving means to attain a normal film delivery, and with the attainment of such reversal or reëngagement of the reel driving mechanism effect an automatic release of the locking means of the intermittent film feeding mechanism aforesaid.

To provide a simple and efficient automatic connection, whereby the automatic driving mechanism of the film reels, is automatically released from a driven association with the mechanisms of the machine, as the operator effects a reversal or disengagement of the reel driving mechanism previous to a separate film rewinding operation.

To provide a simple and efficient means for guiding an edge of the oblique top loop of the picture film in the rewinding operation, in which operation the film is unthreaded from the intermittent film feeding mechanism, and in such condition requires to be held from accidental rubbing contact with adjacent parts of the machine.

All as will hereinafter more fully appear.

In the accompanying drawings:—

Figure 1 is a perspective view, illustrating the general outside appearance of the apparatus.

Fig. 2, is a side elevation, illustrating the means for effecting a tilting adjusting of the apparatus in a vertical plane.

Fig. 3, is a detail vertical sectional elevation of the tilting means aforesaid.

Fig. 4, is a side elevation, with the inclosing casing and other parts in section.

Fig. 5, is a similar view of the side of the machine opposite to that shown in Fig. 4.

Fig. 10, is a detail section on line 10—10, Fig. 7, of the gearing connections of the machine.

Fig. 11, is a detail side view of automatic release mechanism of the clutch of the carrying shaft of the film delivery and take-up sprocket drums of the reeling mechanism.

Fig. 12, is a detail transverse section on line 12, Fig. 11.

Fig. 15, is a detail longitudinal section on line 15—15, Fig. 13, of the associated light passage or aperture film gate, intermittent film feeding sprocket drum and accessories.

Fig. 16, is a detail horizontal section on line 16—16, Fig. 15, of the film gate latching mechanism.

Fig. 17, is a detail transverse sectional elevation on line 17—17, Fig. 15, of the rotary adjusting means of the intermittent film feeding sprocket drum.

Fig. 18, is a detail section, on line 18—18, Fig. 6, of an adjustable bearing roller associated with the film take-up sprocket drum of the film feeding and reeling mechanisms.

Fig. 19 is a detail side view of the frame or casing of the mechanism, showing the pair of locking recesses for holding the above mentioned adjustable roller in its different positions.

Similar reference numerals indicate like parts in the several views.

Figure 6:
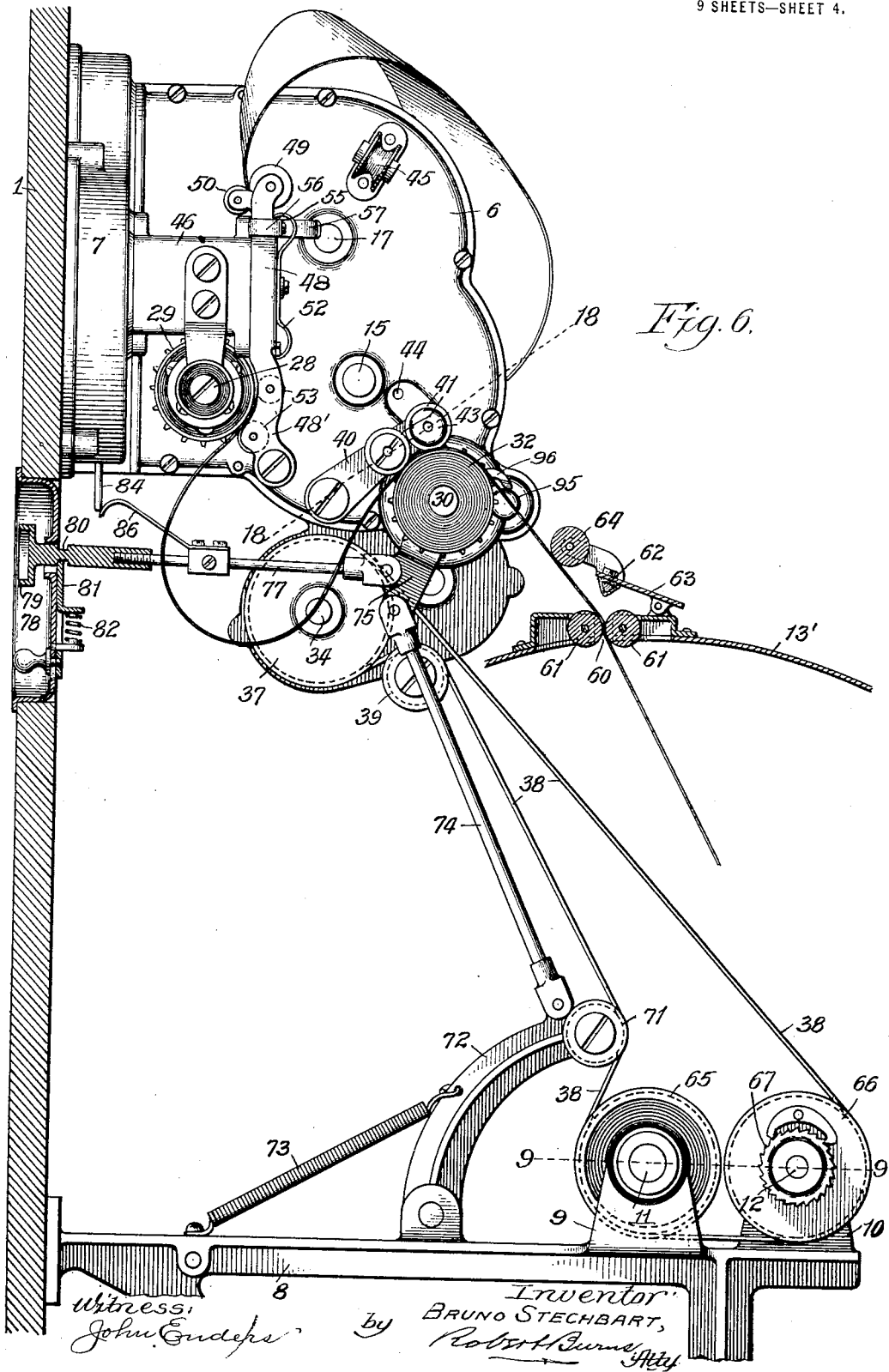
Fig. 6, is an enlarged detail side elevation of the film feeding and guiding mechanism and associated driving mechanism of the film reels, with parts shown in section.

Referring to the drawings, 1 designates a box or casing, preferably of the rectangular form shown, and adapted to inclose the film feeding, film guiding and film reeling mechanisms of a motion picture machine, and afford a support for the usual projection objective 2, lamp house 3, and condenser, usually associated with the aforesaid mechanisms. With a view to afford convenient access to the contained film feeding, reeling and guiding mechanisms, in the varied operations of the same in actual use, the main portions of the respective side walls are hinged to the main portion of the box or casing 1, to constitute entry doors 4 and 5 to the interior of the same.

6 designates the supporting frame or casing for the film feeding and guiding mechanisms above referred to, and is preferably of the closed shell form shown in the drawings, and having spaced vertical walls formed with journal orifices for the various shafts of the different mechanisms hereinafter described. Said frame or casing 6 is secured to the front wall of the casing or box 1, aforesaid, and near its forward end, said frame or casing 6, is provided with a transverse partition 7 forming a containing chamber for the light shutter of the machine, and providing a bearing for the carrying shaft of said shutter, hereinafter described.

8 designates a frame or standard secured in place in the lower part of the casing or box 1, and near the mid-width of the same. Said frame or standard 8, is provided with a pair of journal bearings 9 and 10, disposed in longitudinally spaced relation to each other, and adapted to afford bearings for the carrying shafts 11 and 12 of the pair of companion film reels 13 and 14 hereinafter described in detail.

15 designates the main or crank shaft of the machine, journaled in the supporting frame or casing 6 aforesaid, with one end extending outside of the box or casing 1, and provided with a removable hand crank 16 for manual actuation.

17 designates an intermediate shaft also journaled in the aforesaid frame or casing 6, and having operative engagement with the crank shaft 15, through a pinion 18 on the shaft 17 and a gear wheel 19 on the shaft 15, as shown more particularly in Fig. 10.

20 designates a companion intermediate shaft also journaled in the aforesaid frame or casing 6, and having operative engagement with the aforesaid shaft 17 through a pinion 21 on the shaft 20 and a gear wheel 22 on the shaft 17, as shown. The shaft 20, carries the driving disk or member 23 of an intermittent driving connection 23, 24, such as the ordinary Geneva movement shown in the drawings, and by which the proper intermittent rotary movement is imparted to the film feeding sprocket drum hereinafter described.

Figure 14:
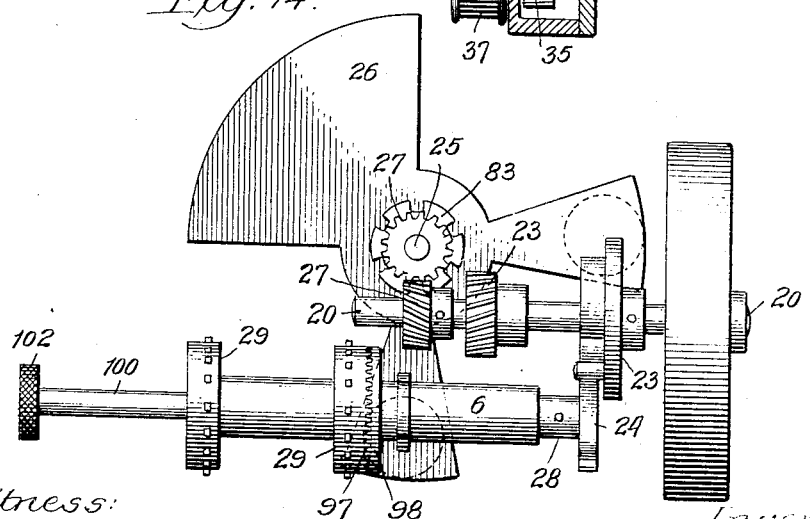
Fig. 14, is a detail rear elevation of the intermittent film feeding sprocket drum and associated light shutter and their operative connections.

25 designates a shaft journaled longitudinally in the aforesaid frame or casing 6, and carrying at its forward end the light shutter 26, preferably of the bladed disk type shown more particularly in Fig. 14. Said shaft 25 is operatively connected to the aforesaid intermediate shaft 20 by a pair of spiral gears 27 so as to have rotative movement in unison with the intermittent film feeding sprocket drum of the machine.

28 designates a companion shaft journaled in the aforesaid frame or casing 6, and having intermittent operative connection with the aforesaid shaft 20 by means of the intermittent driving connection 23, 24, aforesaid. The driven member or star wheel 24, being fixed to said shaft 28.

29 designates the intermittent film feeding sprocket drum of the machine, mounted upon the aforesaid shaft 28, and normally rotatable therewith, except when an independent circular adjustment between said parts is to be made, in the operation of framing the picture film, hereinafter described in detail.

30 designates a clutch carrying shaft journaled in the aforesaid frame or casing 6, and having operative connection with the main shaft 15 aforesaid, through the gear wheel 19 of said shaft 15 and a pinion 31 on said shaft 30. The said pinion 31 is mounted to rotate loosely on the shaft 30 and is adapted to be rotatively engaged therewith by an automatic clutch connection hereinafter described. The shaft 30 extends approximately the width of the mechanism, and its respective ends carry sprocket drums 32, 33, individual to the respective film reels 13, 14, aforesaid, and adapted to guide and feed the picture film to and from said reels in its different movements in actual use.

34 designates a companion shaft journaled in the aforesaid frame or casing 6, and having operative connection with the aforesaid pinion 31 of the shaft 30, through a gear wheel 35 on the shaft 34 and a gear wheel 36 also journaled on the frame or casing 6. Said shaft 34 carries the driving pulley 37 of the endless driving belt 38 of the operating means of the film reels hereinafter described in detail.

39 designates an idler pulley journaled on the aforesaid frame or casing 6 in adjacent relation to the aforesaid pulley 37 and adapted to impose upon the driving belt 38 an extended peripheral contact with the pulley 37 as illustrated more particularly in Fig. 6.

40 designates swinging arms pivoted at opposite sides of the aforesaid frame or casing 6, and each carrying near its free end a pair of bearing rollers 41, with each a pair of said rollers individual to a sprocket drum 32, 33, and normally adapted to maintain the picture film in peripheral engagement with said sprocket drums. The pivotal arrangement of the carrying arms 40 of the rollers 41 above described, admits of said rollers being moved away from the sprocket drums 32, 33, in the operation of removing an exhibited picture film, as well as threading a fresh picture film through the mechanism. Each pair of bearing rollers 41, have a slight spaced relation, so that in the operation of rewinding a picture film back onto the normal delivery reel, and in which operation the film is unthreaded from the intermittent film feeding mechanism and accessories, the film in such unthreaded condition can be inserted between the pair of rollers 41 which are individual to the delivery reel in such rewinding operation, in order that the film may be guided by said rollers into the oblique bend or loop which the film must necessarily assume in its passage from one film reel to the other in the present structural arrangement. Such form of loop or bend is shown more particularly in Fig. 4.

In the preferred detail construction, illustrated in Figs. 18, 19, the carrying shaft 42 of one of a pair of aforesaid rollers 41 is formed with a tubular bore for the reception and movement of an axially sliding spring impelled bolt 43, adapted to engage in one or the other of a pair of spaced orifices 44 in the frame 6, to hold the carrying arm 40 and rollers 41 in either of the positions above described.

45 designates a peripherally grooved roller journaled in an inclined direction on the side of the frame or casing 6 aforesaid, with its peripheral groove adapted to have holding and guiding engagement with the edge of the picture film to maintain its oblique loop in proper position during the film rewinding operation as above described.

46 designates a light passage or aperture formed in the frame or casing 6 aforesaid, with its forward end adapted to receive the optical objective 2 of the machine, while its inner end terminates in the vertical rear wall of said frame or casing to which is secured the usual aperture plate 47 upon which the picture film has a sliding movement in its passage through the optical axis of the machine.

48 designates the film confining gate of the ordinary apertured plate form, associated with the apertured film guiding plate 47 aforesaid. In the construction shown in the drawings, the film confining gate 48 aforesaid, is pivoted to the frame or casing 6, by depending side extensions 48' at its lower end, and has a swinging movement in a vertical plane to and from the aforesaid vertical film guiding aperture plate 47, to admit of the ready insertion and removal of the picture film.

49 designates a guide roller journaled transversely of the film gate 47 and at the upper end thereof, and having close association with a companion guide roller 50 on the upper portion of the frame or casing 6, to provide an upper guiding means for the picture film in its passage past the light aperture of the guide plate 47. In the present structure, said guide rollers 49, 50, in connection with the sprocket drum 33 individual to the delivery reel 14, of the machine, constitute the forming and maintaining means for the large and obliquely extending loop in the film, from which the supply of film to the intermittent film feeding mechanism is taken with but little frictional impedance.

51 designate upper and lower bearing pads of textile or like elastic material, arranged transversely and adjacent to the respective upper and lower margins of the light aperture of the guide plate 47, and secured to the film gate 48 by screws or like fastening means.

52 designates vertical spring members secured at their mid-height to the film gate 48, at opposite sides of the light aperture of the guide plate 47 and bearing pads 51 aforesaid, and having a flat loop form as shown, and adapting them to exert an extended yielding stress upon the passing picture film and hold the same against the apertured guide plate 47, without undue frictional retardance.

53 designate a plurality of bearing rollers journaled in the curved lower portion of the gate frame, and adapted to hold the picture film in proper operative engagement with the intermittent film feeding sprocket drum 29 aforesaid.

54 designates a curved plate or apron fixedly secured to the lower end of the film gate 48 and adapted in connection with the bearing rollers 53 aforesaid, to maintain proper operative engagement between the picture film and the intermittent film feeding sprocket drum 29 aforesaid.

55 designate a pair of latch members having a transverse sliding movement on the upper part of the film gate 48, and provided with hook shaped flanges 56 on their outer ends for holding engagement with lugs on the frame or casing 6 aforesaid. The inner ends of the latch members 55 lap past each other and are provided with outturned prongs or finger pieces 57 for convenient manual operation, and so that when the said prongs 57 are pressed toward each other by the fingers of the operator, the hook shaped flanges 56 aforesaid, will move outwardly and be released from their holding engagement with the aforesaid lugs of the frame or casing 6, and thus leaving the film gate free for its opening or swinging movement to release the picture film.

57' designates a spring interposed between the finger pieces 57 aforesaid, and adapted to force the same apart and in turn draw the latch members 55 together.

In the present structure, the intermittent film feeding sprocket drum 29 is arranged immediately beneath the light passage 46 of the frame or casing 6, with the rear part of its toothed periphery in line with the guide face of the rear wall of the frame or casing 6, as shown more particularly in Fig. 15 and in connection with such arrangement the present improvement involves the provision of a curved breast plate as follows:—

58 designates a curved breast plate, preferably formed as an extension of the guide plate 47 aforesaid, with its curved portion arranged between the sprocket carrying end disks of the intermittent sprocket drum 29, and in line with the perimeter of said disks. Said breast plate is adapted to support the central portion of the passing film, and is formed with a reversely curved portion 59 adapted to deflect the film away from said sprocket drum, and aid in the formation of the usual loop in the film, intermediate of the aforesaid sprocket drum 29 and the "take up" sprocket drum 32 aforesaid.

With the above described structural formation and association of parts, the picture film can be fed backward by the intermittent film feeding mechanism, in giving such form of a motion picture exhibition, in that the pushing backward of the film can be practically effected, due to the absence of any extended and unsupported portions in that part of the film within and adjacent to the zone of exhibition.

The detail structure of the film reeling mechanism, shown in Figs. 4, 5, 6, 7 and 9, of the drawings, is the subject matter of my companion application for patent, Serial No. 166,866, filed May 7, 1917, the features of novelty in the present case involving an interconnection of the operating and controlling means of said film reeling mechanism, with the intermittent film feeding mechanisms of the machine, and with the view to greater safety in the practical use of the apparatus. In the construction shown in the drawings:—

13' and 14' designate individual reel magazines carried on the respective sides of the fixed frame or standard 8 aforesaid and provided with the usual hinged doors at their sides remote from said frame or standard, for the introduction and removal of the film reels 13 and 14 onto and from their carrying shafts 11 and 12 aforesaid. In addition said magazines 13', 14', are provided with the usual peripheral orifices 60, for the passage of the film to and from the film reels 13, 14, as usual in film reeling mechanisms used in connection with motion picture machines.

61 designate transverse guide and friction reducing rollers arranged at the margins of the respective peripheral orifices 60 of the reel magazines aforesaid.

62 designates a swinging valve or gate, triangular in cross-section, arranged in operative relation to an orifice 60 of a magazine aforesaid, and adapted to close the gap between a pair of the rollers 61, in the event of the picture film taking fire outside a magazine.

63 designates the carrying plate or frame of the valve or gate 62, aforesaid, pivoted at one end to the magazine, and carrying said valve or gate near its mid-length, while its free end is provided with a bearing roller 64 adapted to ride upon a tensioned portion of the picture film, and hold said gate or valve 62 away from the guide rollers 61 in the normal operation of the apparatus, as illustrated more particularly in Fig. 6. With an accidental firing of said film, the said gate or valve 62 will drop by gravity and close the gap or opening between the rollers 61, as the fire releases the tension normally on the picture film.

65 and 66 designate companion driven pulleys mounted on the before described carrying shafts 11 and 12 of the film reels 13, 14, and operatively connected thereto by pawl and ratchet connections 67, so that positive motion can be imparted to a carrying shaft 11, 12, in one direction only, the particular pulley running idle when rotated in the other direction.

In the structure shown in the drawings, the aforesaid pulleys 65, 66, have a spaced relation longitudinally, in order that the aforesaid endless driving belt 38 in engagement with the aforesaid driving pulley 37 can pass around and beneath the aforesaid driven pulleys 65, 66, to impart simultaneous rotation to said pulleys and in the same direction. With the above described arrangement of parts, a travel of the endless belt 38 in one direction will effect a positive rotation of one film reel in one direction, with the companion film reel running idle, while with a travel of the endless belt 38 in the opposite direction the last mentioned film reel will receive positive rotation, and the first mentioned reel will run idle.

68 designate fixed centering cones on the shaft 11 and 12 aforesaid, adjacent to their journal bearings. And 69 designate adjustable centering cones having movement on the outer portions of said shafts, and preferably as integral portions of adjusting nuts 70, to properly center and clamp the film reels 13, 14, on their respective carrying shafts 11, 12.

71 designates a tightening roller or drum journaled in the upper end of a carrying frame 72, which is pivoted at its lower end to the frame or standard 8 aforesaid. The carrying frame 72 is preferably of the curved form shown, and arranged in an inclined position, and with its roller or drum 71 having bearing against the endless driving belt 38, at a distance away from the point of engagement of said endless belt with the driven pulleys 65, 66 of the reeling mechanism aforesaid.

73 designates a spring associated with the carrying frame 72 aforesaid, and adapted to draw the same away from the tightening engagement of its roller or drum 71, with the endless driving belt 38 aforesaid.

74 designates a link pivoted at its lower end to the carrying frame 72 aforesaid, and at its upper end to the lower end of a companion link 75, the upper end of which is provided with an enlarged hub 76 having journal bearing on the clutch shaft 30 aforesaid. The companion links 74, 75, constitute a toggle formation, which, when forcibly straightened by means hereinafter described, will cause the tightener roller or drum 71 to bear upon and tighten the endless belt 38 upon its associated belt pulleys aforesaid.

77 designates a horizontally disposed operating rod, the inner end of which is pivotally connected to the upper link 75 aforesaid, while its outer portion slides in a latch plate 78 on the main casing 1, and is provided with an operating handle or knob 79 for convenient manual operation. The operating rod 77 is formed with a peripheral groove 80 near its outer end for locking engagement with a spring bolt or latch, as follows:

81 designates a vertically sliding latch bolt on the latch plate 78 aforesaid, with a normal tendency under the influence of a spring 82 to engage in the peripheral groove 80 of the aforesaid operating rod 77, to hold the same and associated toggle and belt tightening mechanisms in their active positions.

The present improvement involves as one of its features of novelty, safety interconnecting means between the intermittent film feeding mechanism and the film reeling mechanism, as follows:—

83 designates a peripherally notched disk fixed on the carrying shaft 25 of the light shutter 26 heretofore described.

84 designates a sliding bolt adapted for locking engagement in an adjacent peripheral notch of the disk 83 aforesaid, and normally held out of locking engagement with said disk by a spring 85.

86 designates an inclined track or cam rail carried by the operating rod 77 aforesaid, and adapted to move beneath the sliding bolt 84 and lift and hold the same in locking engagement with the notched disk 83, while the said operating rod 77 is in its outward position with its associated belt tightening mechanism in a released condition in which no positive driving connection exists between the endless driving belt 38 and driven pulley 65, 66 of the film reels. With the above conditions existing, the machine is in condition for a rewinding by hand, through the instrumentality of a removable hand crank 87 on the carrying shaft 12 of the delivery film reel 14, of the picture film back from the receiving reel 13 onto said delivery reel 14, after an exhibition has been made of said film and so that the same may be in proper reeled condition for subsequent use.

The safety feature of the above described mechanism, is that the film feeding mechanism of the machine is locked against accidental movement and consequent damage, while a film rewinding operation is taking place, and held locked until the film reeling mechanism is restored to its normal delivery condition.

In the present improvement the aforesaid hub 76 of the toggle link 75 is operatively associated with the automatic clutch connection of the clutch carrying shaft 30 heretofore referred to, by a structural formation and association of parts as follows:—

88 designates a collar fixed on the shaft 30 and providing a guide for a sliding clutch pin 89 adapted for operative engagement in one or the other of a circular cluster of recesses 90 in the adjacent side of the pinion 31 of said shaft, so as to lock said pinions and shaft together for simultaneous rotation in one position of the clutch parts, and leaving said pinion and shaft in a disengaged condition in the other position of said clutch parts.

91 designates a collar sliding on the shaft 30 aforesaid, and carrying the clutch pin 89 aforesaid. Said collar is formed with hub portion having a peripheral groove for engagement with operating means as follows:—

92 designates a spindle or shaft having a sliding movement in the frame or casing 6 aforesaid, in a plane parallel with the clutch carrying shaft 30, and carrying a yoke 93, having operative engagement in the aforesaid peripheral groove of the hub of the collar 91 aforesaid.

94 designates a spring associated with the aforesaid spindle or shaft 92, and adapted to yieldingly move the clutching means above described into their engaged condition.

95 designates a collar or button fixed on the end of the spindle or shaft 92, outside the frame or casing 6, and adapted for engagement by operating means as follows:—

96 designates a cam plate carried by an outer portion of the hub 76 of the toggle link 75 aforesaid, with the cam portion or inclined end of said cam plate adapted to engage the aforesaid collar or button 95 and move the spindle 92 and associated clutching means into a disengaged condition, when the aforesaid link 75 has movement in unison with its companion link 74 and operating rod 77 to release the tightening mechanism of the endless driving belt 38 previous to the film rewinding operation above described. By means of the automatic mechanism just described, positive rotation of the sprocket drums 32, 33, on the shaft 30 is discontinued, and said sprocket drums are left free to rotate idly with the passing portions of the film with which they are in engagement.

The framing mechanism for effecting the proper adjustment of the picture film in relation to the light passage or aperture of the machine shown in the drawings, forms the subject matter of my companion application for Letters Patent, Serial No. 166,867, filed May 7, 1917, and comprises a detail construction as follows:—

The intermittent film feeding sprocket drum 29 before described is loosely mounted on its carrying shaft 28, so as to be capable of a limited independent sliding and turning adjustment with relation to said shaft, and said drum is normally locked to said shaft by inter-engaging detent clutch teeth 97, on the adjacent ends of said drum 29 and of a clutch collar 98 fixed on the shaft 28, as shown more particularly in Fig. 17.

99 designates a spring arranged within an enlarged counterbore of the drum 29 and bearing against an abutment collar 99' on the shaft 28, with a normal tendency to maintain the aforesaid clutch teeth 97 in an engaged condition.

Figure 7:
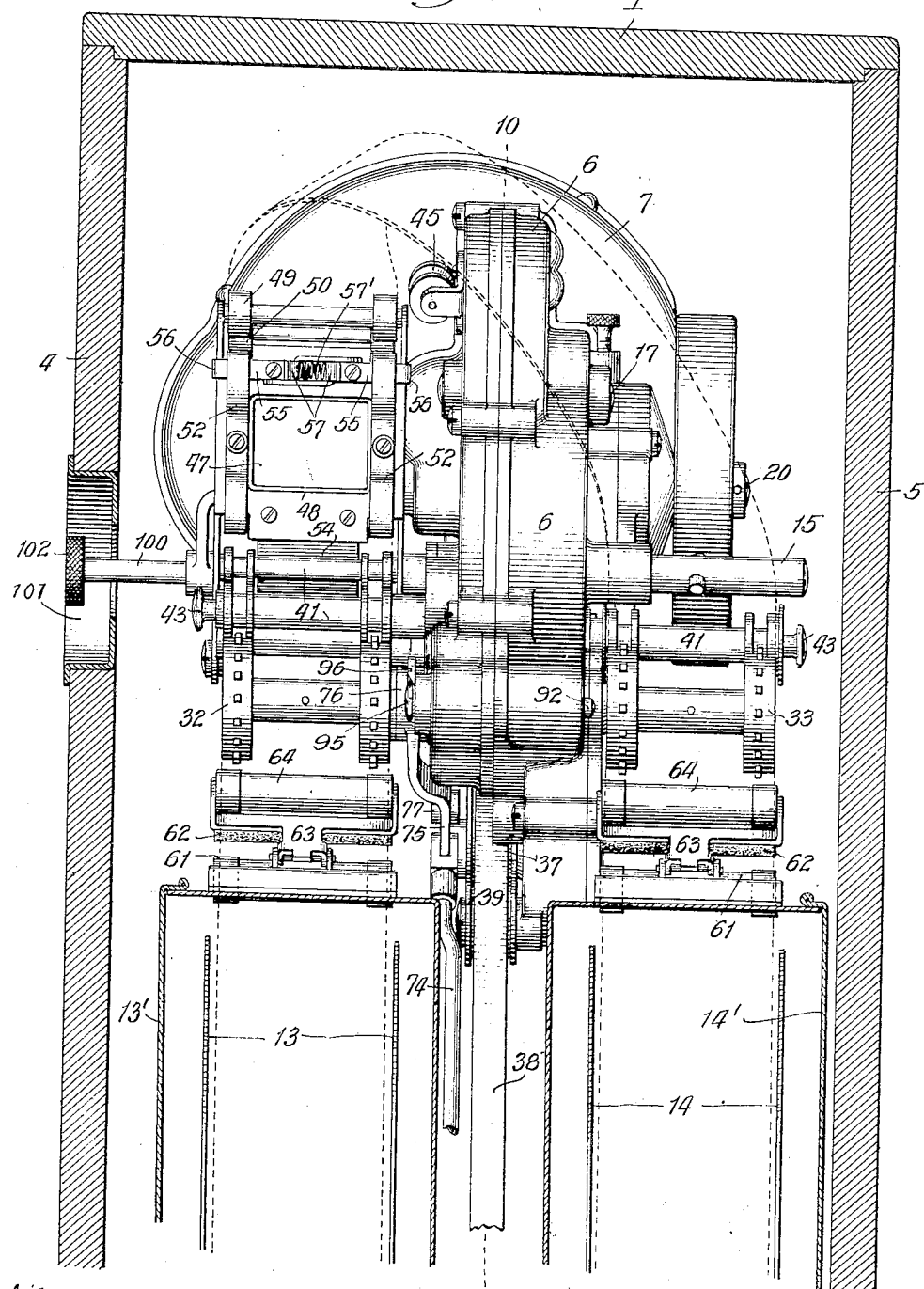
Fig. 7, is a detail rear elevation of the same, with parts in section.
Figure 8:
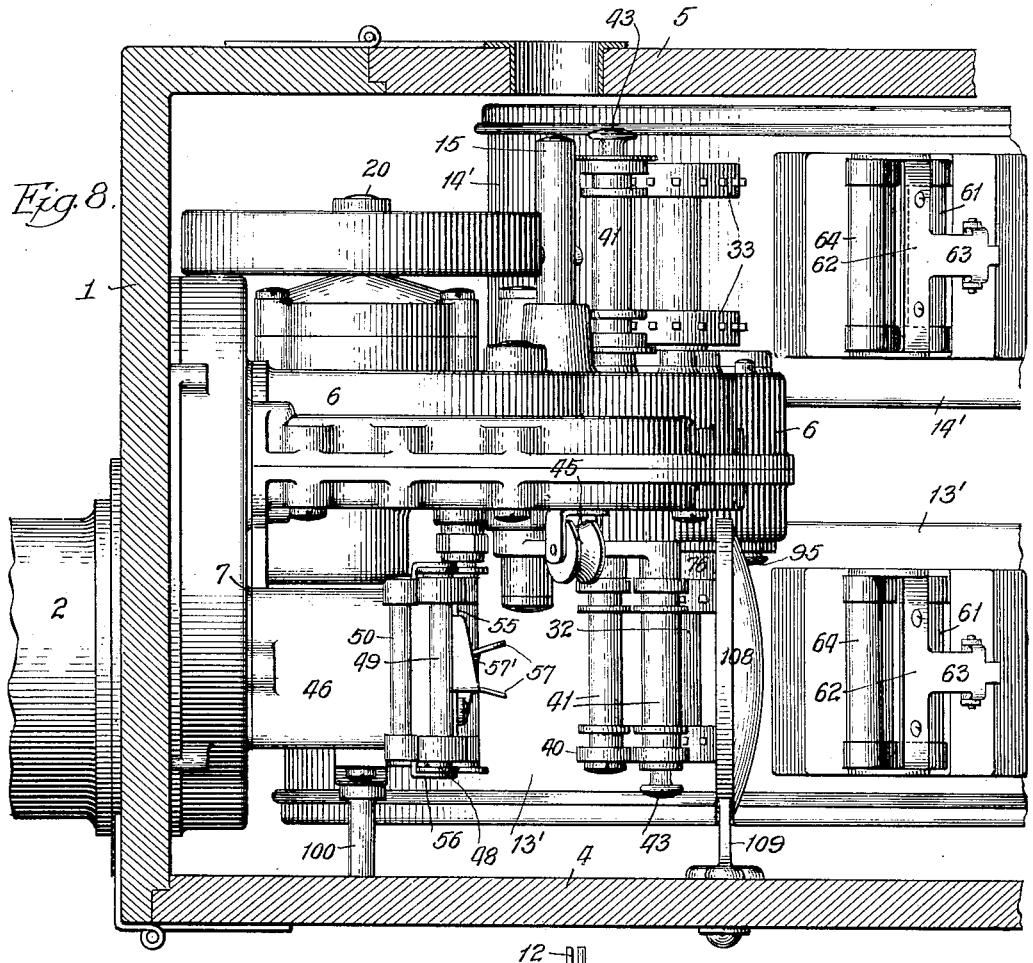
Fig. 8, is a detail top plan of same with parts in section.
Figure 9:
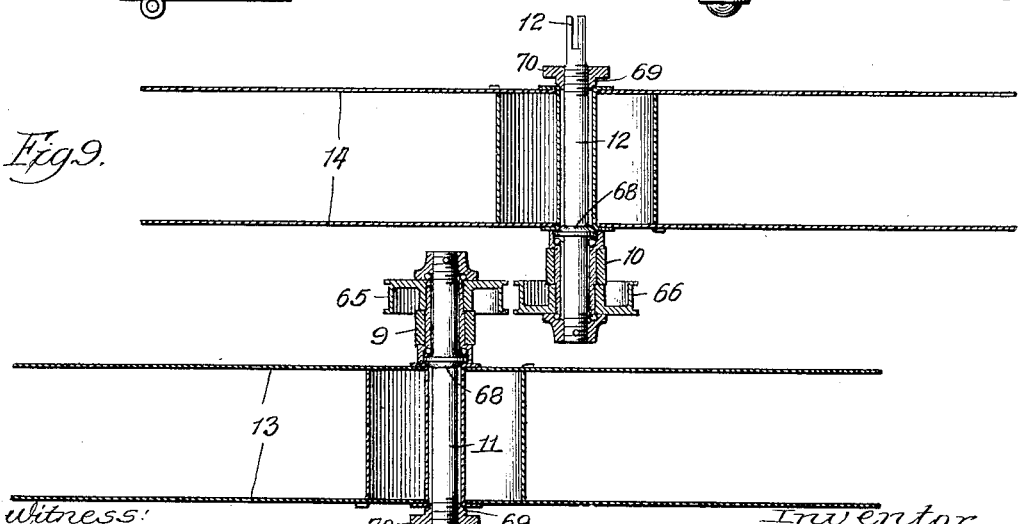
Fig. 9, is a detail horizontal section on line 9—9, Fig. 6 of the film reels and associated parts.
Figure 13:
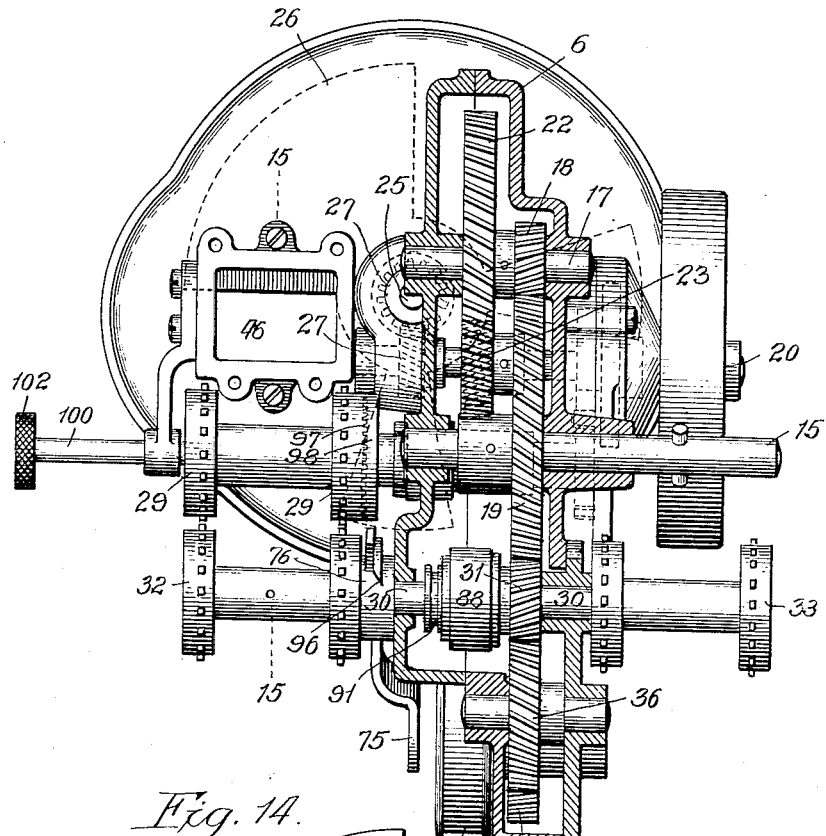
Fig. 13, is a detail rear elevation of the film feeding and guiding mechanism and accessories, with the supporting frame or casing thereof, in section.

100 designates an operating shaft secured in alined relation to the sprocket drum 29 aforesaid. Said shaft 100, extends laterally through a sunken bushing 101 in one side of the main casing 1, and is provided with a handle or knob 102 for manual operation. In the construction shown, the handle or knob 102 occupies the open cavity of the sunken bushing 101, in the normal condition of the parts, and as illustrated in Fig. 7.

With the above described construction, an outward pull or movement of the knob 102 and shaft 100 will effect a disengagement of the clutch teeth 97, against the yielding stress of the spring 99, and in such condition of the parts, the operator can effect an independent turning adjustment of the sprocket drum 29 in one direction or the other to attain a proper framing of the picture film in relation to the light passage or aperture of the machine.

With a view to prevent an excessive turning adjustment of the sprocket drum 29 and a consequent liability to tearing of the picture film, the degree of adjustment is limited by the provision of a pin and elongated recess formation 103 on the sleeve portions of the sprocket drum 29 and clutch member 97, which is fixed on the shaft 28, aforesaid.

The lamp house 3 and the associated condenser lens system, shown in the drawings, constitute the subject matter of my companion application for patent, Serial No. 166,868, filed May 7, 1917, and comprises as follows:—

3 designates the lamp house or casing of a cylindrical form, supported in an annular bushing 104, attached to the top wall of the main casing 1, with the main portion of said house or casing 3 depending into the interior of the main casing 1 and carrying the primary lens member 105 of condenser system of the machine. Said lamp house or casing 3 is provided with ventilating openings 106 and 107 near its top, intermediate and bottom portions, to permit of a free circulation of air during the use of the machine, so as to carry off the heat emitted by the electrical illuminant arranged within said lamp house or casing 3.

The electrical illuminant above referred to will preferably be an incandescent electric lamp of the nitrogen gas type, now in general use in the art, and located in said lamp house 3 in line with the optical axis of the primary condenser lens member 105 aforesaid.

108 designates a companion condenser lens member carried by a transversely arranged bracket support 109, attached to the hinged door 5 of the main casing 1 as shown in Fig. 3, and adapted to swing away from the film feeding and guiding mechanisms, with which it is ordinarily closely associated, when said door is opened to afford access to and manipulation of said film feeding and guiding mechanisms. The lens 108 is the secondary lens member of the condenser system of the machine, and owing to its arrangement as above described, it is practical to have it occupy a space immediately back of the film gate aforesaid, and thus aid in the attainment of a compact arrangement of the complete machine.

110 designate a pair of adjustable legs, preferably formed with semi-spherical enlargements 111 on their lower ends, and having movement in a plane at right-angles to the optical axis and light passage of the machine. Said legs are guided by guide orifices in the bottom web of the casing 1, and by guide bushings 112 in the front web of said casing, as illustrated in Figs. 1, 2 and 3.

113 designate clamping screws associated with the bushings 112 and adapted to clamp the legs 110 at their required adjustment.

114 designate companion semi-spherical buttons attached to the aforesaid bottom web of the casing 1 near the rear corners of the same, and adapted to act as rockers for the casing 1, in the tilting adjustment of the same, and which in the present structure is attained by the adjustment of the legs 110 aforesaid, to properly tilt the casing 1 and the objective 2, so that the picture projected will be displayed in proper position on the exhibition screen.

Having thus fully described my said invention what I claim as new and desire to secure by Letters Patent, is:—

1. In a motion picture machine, the combination of an intermittent film feeding mechanism, a film supply drum and a film take up drum arranged in transversely spaced relation on a common shaft, a clutch connection between said shaft and the operating gearing of the film feeding mechanism, film reels individual to the supply and take up drums aforesaid, a manually controlled driving means between said reels and the operating gearing aforesaid, and connecting means between said driving means and the clutch connection aforesaid, substantially as set forth.

2. In a motion picture machine, the combination of an intermittent film feeding mechanism, a film supply drum and a film take up drum arranged in transversely spaced relation on a common shaft, a clutch connection between said shaft and the operating gearing of the film feeding mechanism, film reels individual to the supply and take up drums aforesaid, a driving pulley receiving motion from the driven element of the clutch connection aforesaid, an endless drive belt common to said reels and to the driving pulley aforesaid, and a belt tightener associated with said endless belt and having operative connection with the clutch connection aforesaid, substantially as set forth.

3. In a motion picture machine, the combination of an intermittent film feeding mechanism and interconnected light controlling means, operating gearing for said feeding and controlling means, a shaft associated with said feeding and controlling means and provided with a notched collar, a latching bolt adapted for engagement with said notched collar, a pair of film reels, a manually controlled driving means between said reels and the operating gearing aforesaid, and connecting means between said driving means and the latching bolt aforesaid, substantially as set forth.

4. In a motion picture machine, the combination of an intermittent film feeding mechanism and interconnected light controlling means, operating gearing for said feeding and controlling means, a shaft associated with said feeding and controlling means and provided with a notched collar, a latching bolt adapted for engagement with said notched collar, a pair of film reels, an endless drive belt common to said reels and a driving pulley, and a belt tightener associated with said endless belt and having operative connection with the latching means aforesaid, substantially as set forth.

5. In a motion picture machine, the combination of an intermittent film feeding mechanism and interconnected light controlling means, operating gearing for said feeding and controlling means, a shaft associated with said feeding and controlling means and provided with a notched collar, a latching bolt adapted for engagement with said notched collar, a film supply drum and a film take up drum arranged in transversely spaced relation on a common shaft, a clutch connection between said shaft and the operating gearing of the film feeding mechanism, film reels individual to the supply and take up drums aforesaid, a manually controlled driving means between said reels and the driving means between said reels and the operating gearing aforesaid, and including operative connections with the clutch connection aforesaid, and operative connections with the latching bolt aforesaid.

6. In a motion picture machine, the combination of an intermittent film feeding mechanism and interconnected light controlling means, operating gearing for said feeding and controlling means, a shaft associated with said feeding and controlling means and provided with a notched collar, a latching bolt adapted for engagement with said notched collar, a film supply drum and a film take up drum arranged in transversely spaced relation on a common shaft, a clutch connection between said shaft and the operating gearing of the film feeding mechanism, film reels individual to the supply and take up drums aforesaid, a driving pulley receiving motion from the driven element of the clutch connection aforesaid, an endless drive belt common to said reels and to the driving pulley aforesaid, and a belt tightener associated with said endless belt and having operative connection with the clutch connection aforesaid, and operative connection with the latching bolt aforesaid, substantially as set forth.

7. In a motion picture machine, the combination of an intermittent film feeding mechanism, a film supply drum and a film take up drum arranged in transversely spaced relation on a common shaft, a clutch connection between said shaft and the operating gearing of the film feeding mechanism, film reels individual to the supply and take up drums aforesaid, a manually controlled driving means between said reels and the operating gearing aforesaid, connecting means between said driving means and the clutch connection aforesaid, and a guide roller journaled in an inclined direction on the machine frame and having a peripheral groove for guiding engagement with an edge of the film, substantially as set forth.

8. In a motion picture machine, the combination of an intermittent film feeding mechanism, a film supply drum and a film take up drum arranged in transversely spaced relation on a common shaft, a clutch connection between said shaft and the operating gearing of the film feeding mechanism, film reels individual to the supply and take up drums aforesaid, a driving pulley receiving motion from the driven element of the clutch connection aforesaid, an endless drive belt common to said reels and the driving pulley aforesaid, a belt tightener associated with said endless belt and having operative connection with the clutch connection aforesaid, and a guide roller journaled in an inclined direction on the machine frame and having a peripheral groove for guiding engagement with an edge of the film, substantially as set forth.

9. In a motion picture machine, the combination of an intermittent film feeding mechanism, a film supply drum and a film take up drum arranged in transversely spaced relation on a common shaft, a clutch connection between said shaft and the operating gearing of the film feeding mechanism, film reels individual to the supply and take up drums aforesaid, a manually controlled driving means between said reels and the operating gearing aforesaid, connecting means between said driving means and the clutch connection aforesaid, a pair of idler rollers associated with a drum aforesaid, and an adjustable arm carrying said idler rollers, substantially as set forth.

10. In a motion picture machine, the combination of an intermittent film feeding mechanism, a film supply drum and a film take up drum arranged in transversely spaced relation on a common shaft, a clutch connection between said shaft and the operating gearing of the film feeding mechanism, film reels individual to the supply and take up drums aforesaid, a driving pulley receiving motion from the driven element of the clutch connection aforesaid, an endless belt common to said reels and to the driving pulley aforesaid, a belt tightener associated with said endless belt and having operative connection with the clutch connection aforesaid, a pair of idler rollers associated with a drum aforesaid, and an adjustable arm carrying said idler rollers, substantially as set forth.

11. In a motion picture machine, the combination of an intermittent film feeding mechanism, a film supply drum and a film take up drum arranged in transversely spaced relation on a common shaft, a clutch connection between said shaft and the operating gearing of the film feeding mechanism, film reels individual to the supply and take up drums aforesaid, a manually controlled driving means between said reels and the operating gearing aforesaid, connecting means between said driving means and the clutch connection aforesaid, a pair of idler rollers associated with a drum aforesaid, an adjustable arm carrying said idler rollers, and means for securing said arm in its adjusted positions, substantially as set forth.

12. In a motion picture machine, the combination of an intermittent film feeding mechanism, a film supply drum and a film take up drum arranged in transversely spaced relation on a common shaft, a clutch connection between said shaft and the operating gearing of the film feeding mechanism, film reels individual to the supply and take up drums aforesaid, a driving pulley receiving motion from the driven element of the clutch connection aforesaid, an endless belt common to said reels and to the driving pulley aforesaid, a belt tightener associated with said endless belt and having operative connection with the clutch connection aforesaid, a pair of idler rollers associated with a drum aforesaid, an adjustable arm carrying said rollers, and means for securing said arm in its adjusted positions, substantially as set forth.

Signed at Chicago, Illinois, this 16th day of April, 1917.

BRUNO STECHBART.